US012786362B2

(12) United States Patent
Jeong et al.

(10) Patent No.: US 12,786,362 B2
(45) Date of Patent: Nov. 3, 2026

(54) IMAGE OUTPUT DEVICE AND CONTROL METHOD FOR SAME

(71) Applicant: SAMSUNG ELECTRONICS CO., LTD., Suwon-si (KR)

(72) Inventors: Younghoon Jeong, Suwon-si (KR); Jaesung Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/008,331

(22) Filed: Jan. 2, 2025

(65) Prior Publication Data

US 2025/0168302 A1 May 22, 2025

Related U.S. Application Data

(63) Continuation of application No. PCT/KR2023/007263, filed on May 26, 2023.

(30) Foreign Application Priority Data

Jul. 14, 2022 (KR) ........................ 10-2022-0087184

(51) Int. Cl.
*H04N 9/31* (2006.01)
*G06T 5/92* (2024.01)
*G06T 7/50* (2017.01)

(52) U.S. Cl.
CPC ............ *H04N 9/3179* (2013.01); *G06T 5/92* (2024.01); *G06T 7/50* (2017.01); *H04N 9/3147* (2013.01); *G06T 2207/20104* (2013.01)

(58) Field of Classification Search
CPC ...... H04N 9/3179; H04N 9/3147; H04N 5/74; H04N 9/31; H04N 9/3182; H04N 9/64;
(Continued)

(56) References Cited

U.S. PATENT DOCUMENTS 8,411,137 B2 4/2013 Jacobs et al.
8,552,923 B2 10/2013 Lee et al.
(Continued)

FOREIGN PATENT DOCUMENTS

CN 112351264 A 2/2021
JP 2015-97049 A 5/2015
(Continued)

OTHER PUBLICATIONS

International Search Report (PCT/ISA/210) issued by the International Searching Authority on Aug. 29, 2023 in corresponding International Application No. PCT/KR2023/007263.
(Continued)

*Primary Examiner* — John W Miller
*Assistant Examiner* — Omer Khalid
(74) *Attorney, Agent, or Firm* — Sughrue Mion, PLLC

(57) ABSTRACT

Disclosed is an image output device including a projector and a communication interface including a circuit. The image output device acquires brightness information of an input image received via the communication interface, identifies whether another image output device outputs the input image by adjusting its luminance, by communicating with the other image output device that receives a same image as the input image and outputs the same image onto a projection surface, adjusts the luminance of at least one area included in the input image based on the brightness information according to a result of the identifying, and controls the projector to output the adjusted input image onto the projection surface.

19 Claims, 10 Drawing Sheets

(58) Field of Classification Search
CPC .... H04N 13/133; H04N 13/363; H04N 21/41; H04N 21/436; H04N 21/485; H04N 9/643; H04N 21/4122; H04N 21/43615; H04N 21/4854; G06T 5/92; G06T 7/50; G06T 2207/20104; G06T 5/00
USPC .......................................................... 348/576
See application file for complete search history.

(56) References Cited

U.S. PATENT DOCUMENTS

| | | | | |
|---|---|---|---|---|
| 8,648,964 | B2 * | 2/2014 | Ishibashi | G06F 3/1446 348/383 |
| 8,929,657 | B2 | 1/2015 | Jung | |
| 2021/0006689 | A1 * | 1/2021 | Yamamoto | H04N 5/66 |

FOREIGN PATENT DOCUMENTS

| | | | | |
|---|---|---|---|---|
| JP | 6140987 | B2 | 6/2017 | |
| JP | 2018-55109 | A | 4/2018 | |
| JP | 2019-101066 | A | 6/2019 | |
| KR | 10-2009-0029484 | A | 3/2009 | |
| KR | 10-2010-0023786 | A | 3/2010 | |
| KR | 10-2010-0023787 | A | 3/2010 | |
| KR | 10-2014-0063536 | A | 5/2014 | |
| KR | 10-2017-0044399 | A | 4/2017 | |
| KR | 20170044399 | A * | 4/2017 | G03B 21/14 |
| KR | 10-1959281 | B1 | 3/2019 | |

OTHER PUBLICATIONS

Written Opinion (PCT/ISA/237) issued by the International Searching Authority on Aug. 29, 2023 in corresponding International Application No. PCT/KR2023/007263.

Office Action issued Aug. 18, 2026 by the Korean Ministry of Intellectual Property for KR Patent Application No. 10-2022-0087184.

* cited by examiner

IMAGE OUTPUT DEVICE AND CONTROL METHOD FOR SAME

CROSS-REFERENCE TO RELATED APPLICATIONS

This application is a bypass continuation application of International Application No. PCT/KR2023/007263 designating the United States, filed on May 26, 2023, in the Korean Intellectual Property Receiving Office and claiming priority to Korean Patent Application No. 10-2022-0087184, filed on Jul. 14, 2022, in the Korean Intellectual Property Office, the disclosures of which are incorporated by reference herein in their entireties.

BACKGROUND

1. Field

The present disclosure relates to an image output device and a control method for the same, and more particularly, to an image output device that communicates with another image output device, and a control method for the same.

2. Description of Related Art

In recent years, various types of display devices have been developed and supplied.

In various image display environments, there are increasing cases of using a plurality of display devices, especially a plurality of projector devices, rather than just one display device.

Using the plurality of projector devices may have various effects and advantages, such as increasing the size or maximum output luminance of an image, and may also cause a problem such as excessive increase in the luminance of the image or decrease in a contrast ratio or dynamic range.

In case that the respective images output by the plurality of projector devices are provided in an overlay manner, the image may have advantages such as increased luminance to the maximum output luminance and enhanced three-dimensionality. Therefore, there has been a demand for a method to maintain or increase the contrast ratio and dynamic range of the image while maintaining these advantages.

SUMMARY

The disclosure relates to an image output device that provides a user with one image by communicating with a plurality of image output devices, and a control method for the same.

According to an aspect of the disclosure, there is provided an image output device including: a projector; a communication interface including a circuit; memory storing instructions; and at least one processor, wherein the instructions, when executed by the at least one processor, cause the image output device to: acquire brightness information of an input image received via the communication interface, identify whether another image output device outputs the input image by adjusting its luminance, by communicating with the other image output device that receives a same image as the input image and outputs the same image onto a projection surface, adjust the luminance of at least one area included in the input image based on the brightness information according to a result of the identifying, and control the projector to output the adjusted input image onto the projection surface.

The instructions, when executed by the at least one processor, may cause the image output device to acquire the adjusted input image, where the luminance of a relatively bright area is increased and the luminance of a relatively dark area is decreased, among the at least one area included in the input image, based on the brightness information and a tone map curve for expanding a dynamic range.

The instructions, when executed by the at least one processor, may cause the image output device to: acquire one of a depth map, an object map, or a saliency map, corresponding to the input image, based on the brightness information of the input image, identify distance information of a plurality of objects included in the input image based on one of the depth map or the object map, increase the luminance of an area corresponding to a first object disposed at a relatively short distance among the plurality of objects, and decrease the luminance of an area corresponding to a second object disposed at a relatively long distance among the plurality of objects.

The instructions, when executed by the at least one processor, may cause the image output device to transmit, to the other image output device, at least one of a tone map curve used by the image output device or a depth map or an object map, corresponding to the input image, based on the other image output device being identified as outputting the input image by adjusting its luminance.

The instructions, when executed by the at least one processor, may cause the image output device to control the projector to output the adjusted input image to a corresponding position on the projection surface based on received position information if position information on the projection surface onto which the other image output device outputs the input image is received.

The image output device may include a sensor, wherein the instructions, when executed by the at least one processor, may cause the image output device to: acquire, through the sensor, position information on the projection surface onto which the other image output device outputs the input image, and control the projector to output the adjusted input image to a corresponding position on the projection surface based on the acquired position information.

The instructions, when executed by the at least one processor, may cause the image output device to: set one of the other image output device and the image output device as a master and set the other as a slave, transmit a first control signal to the other image output device for the other image output device to output the input image by adjusting its luminance, and control the projector to output the input image without adjusting the luminance of the input image based on the other image output device being set as the slave, and transmit a second control signal to the other image output device for the other image output device to output the input image without adjusting its luminance, and control the projector to output the adjusted input image after adjusting the luminance of the input image based on the other image output device being set as the master.

The instructions, when executed by the at least one processor, may cause the image output device to: identify at least one object corresponding to a user selection among a plurality of objects included in the input image, and acquire the adjusted input image by increasing the luminance of an area corresponding to the identified at least one object and decreasing the luminance of a remaining area.

A projection screen output by the image output device and a projection screen output by the other image output device may be overlaid at the same position on the projection surface.

According to an aspect of the disclosure, there is provided a control method for an image output device, the control method including: acquiring brightness information of an input image; identifying whether another image output device outputs the image by adjusting its luminance by communicating with the other image output device that receives the same image as the input image and outputs the same image onto a projection surface; adjusting the luminance of at least one area included in the input image based on the brightness information according to a result of the identifying; and outputting the adjusted input image onto the projection surface.

In the adjusting, the adjusted input image may be acquired where the luminance of a relatively bright area is increased and the luminance of a relatively dark area is decreased, among the at least one area included in the input image, based on the brightness information and a tone map curve for expanding a dynamic range.

The adjusting may include acquiring one of a depth map, an object map, or a saliency map, corresponding to the input image, based on the brightness information of the input image, identifying distance information of a plurality of objects included in the input image based on one of the depth map or the object map, increasing the luminance of an area corresponding to a first object disposed at a relatively short distance among the plurality of objects, and decreasing the luminance of an area corresponding to a second object disposed at a relatively long distance among the plurality of objects.

The control method may further include transmitting, to the other image output device, at least one of a tone map curve used by the image output device or a depth map or an object map, corresponding to the input image, based on the other image output device being identified as outputting the image by adjusting its luminance.

In the outputting, the adjusted input image may be output to a corresponding position on the projection surface based on received position information if position information on the projection surface onto which the other image output device outputs the image is received.

The control method may further include acquiring, through the sensor, position information on the projection surface onto which the other image output device outputs the image, wherein in the outputting, the adjusted input image is output to a corresponding position on the projection surface based on the acquired position information.

According to the various embodiments of the present disclosure, it is possible to provide the image by using the plurality of image output devices, and provide the image having the improved visibility by increasing the maximum output luminance of the image.

According to the various embodiments of the present disclosure, it is possible to increase the maximum output luminance of the image, thereby increasing the contrast ratio and dynamic range of the image simultaneously while increasing the visibility, immersion, and three-dimensionality of the image.

BRIEF DESCRIPTION OF THE DRAWINGS

The above and other aspects and/or features of one or more embodiments of the disclosure will be more apparent from the following detailed description, taken in conjunction with the accompanying drawings, in which.

DETAILED DESCRIPTION

Figure 1:
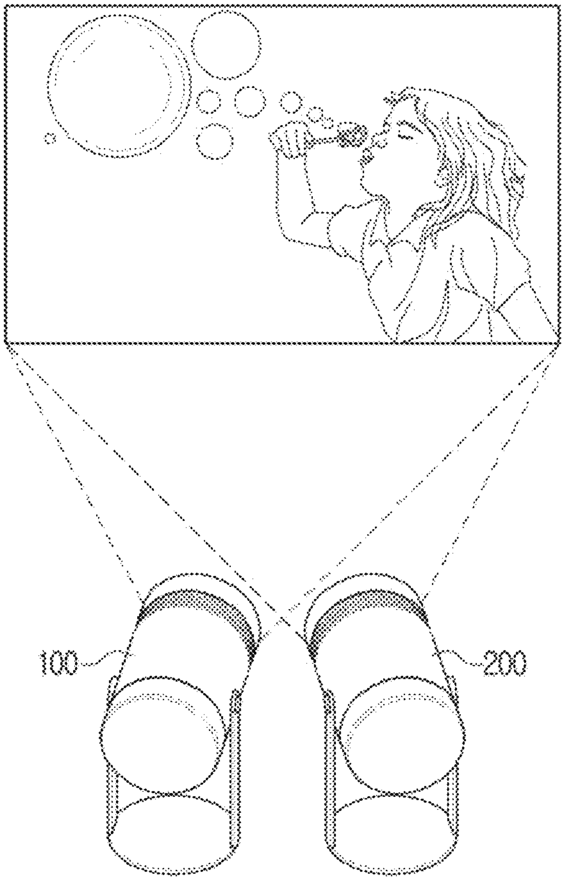
FIG. 1 is a diagram for explaining operations of an image output device and another image output device according to an embodiment of the present disclosure.

Terms used in the specification are briefly described, and the present disclosure is then described in detail.

General terms currently widely used are selected as terms used in embodiments of the present disclosure in consideration of their functions in the present disclosure, and may be changed based on the intentions of those skilled in the art or a judicial precedent, the emergence of a new technique, or the like. In addition, in a specific case, terms arbitrarily chosen by an applicant may exist. In this case, the meanings of such terms are mentioned in detail in corresponding description portions of the present disclosure. Therefore, the terms used in the present disclosure need to be defined on the basis of the meanings of the terms and the contents throughout the present disclosure rather than simple names of the terms.

The present disclosure may be variously modified and have diverse embodiments, and specific embodiments of the present disclosure are thus shown in the drawings and described in detail in the detailed description. However, it is to be understood that the present disclosure is not limited to the specific embodiments, and includes all modifications, equivalents, and substitutions without departing from the scope and spirit of the present disclosure. Omitted is a detailed description of a case where it is decided that the detailed description of the known art related to the present disclosure may obscure the gist of the present disclosure.

Terms "first", "second", and the like, may be used to describe various components. However, the components are not to be construed as being limited to these terms. The terms are used only to distinguish one component and another component from each other.

A term of a singular number may include its plural number unless explicitly indicated otherwise in the context. It is to be understood that a term "include," "formed of," or the like used in this application specifies the presence of features, numerals, steps, operations, components, parts, or combinations thereof, mentioned in the specification, and does not preclude the presence or addition of one or more other features, numerals, steps, operations, components, parts, or combinations thereof.

In the present disclosure, a "module" or a "~er/~or" may perform at least one function or operation, and be implemented by hardware, software, or a combination of hardware and software. In addition, a plurality of "modules" or a plurality of "~ers/~ors" may be integrated in at least one module and implemented by at least one processor (not shown) except for a "module" or a "~er/or" that needs to be implemented by specific hardware.

Hereinafter, the embodiments of the present disclosure are described in detail with reference to the accompanying drawings so that those skilled in the art to which the present disclosure pertains may easily practice the present disclosure. However, the present disclosure may be modified in various different forms, and is not limited to the embodiments provided herein. However, the present disclosure may be modified in various different forms, and is not limited to the embodiments provided herein.

FIG. 1 is a diagram for explaining operations of an image output device and another image output device according to an embodiment of the present disclosure.

Referring to FIG. 1, an image output device 100 and another image output device 200 may respectively be various types of devices that output images.

In particular, each of the image output device 100 and another image output device 200 may be implemented as a projector device that enlarges and projects an image onto a wall or screen, and the projector device may be a liquid crystal display (LCD) projector or a digital light processing (DLP) projector using a digital micromirror device (DMD).

According to various embodiments of the present disclosure, the image output device 100 and another image output device 200 may be the same device or may be different devices.

For example, the details or specifications of image output device 100 and another image output device 200 may be the same as each other. For example, the image output device 100 and another image output device 200 may have the same brightness unit (e.g., American national standards institute (ANSI)-Lumens unit, light emitting diode (LED)-lumens unit), contrast ratio, resolution, or the like. However, this configuration is only an example, and the details or specifications of the image output device 100 and another image output device 200 may be different from each other.

Each of the image output device 100 and another image output device 200 according to an embodiment of the present disclosure may be implemented as the projector device (or a projector display) that projects the image, is not limited thereto, and may be implemented as any of various forms of display devices, such as a television (TV), a video wall, a large format display (LFD), a digital signage, or a digital information display (DID).

Here, the display device may have various types of display panels such as a liquid crystal display (LCD) panel, an organic light-emitting diode (OLED) panel, a liquid crystal on silicon (LCoS) panel, a digital light processing (DLP) panel, a quantum dot (QD) panel, a quantum dot light-emitting diode (QLED) panel, a micro light-emitting diode (µLED) panel, or a mini LED panel.

In addition, each of the image output device 100 and another image output device 200 may be a display device for home or industrial use, may be a lighting device used in daily life, may be an audio device including an audio module, and may be implemented as a portable communication device (e.g., smartphone), a computer device, a portable multimedia device, a wearable device, or a home appliance device.

Meanwhile, each of the image output device 100 and another image output device 200 according to an embodiment of the present disclosure is not limited to the above-described device, and the image output device 100 may be implemented as the image output device 100 having two or more functions of the above-described devices. For example, the image output device 100 may be used as the display device, the lighting device, or the audio device by turning off its projector function and turning on its lighting function or speaker function based on a manipulation of a processor, and may be used as an artificial intelligence (AI) speaker by including a microphone or a communication device.

According to an embodiment of the present disclosure, the image output device 100 and another image output device 200 may be combined with each other to provide one image. For example, an image (hereinafter, a first image) output by the image output device 100 and an image (hereinafter, a second image) output by another image output device 200 may be overlaid with each other (hereinafter, an overlay manner) to form one image (hereinafter, a third image).

As another example, the image (i.e., first image) output by the image output device 100 and the image (i.e., second image) output by another image output device 200 may be arrayed (hereinafter, an array manner) to form one image (for example, one of the images output by the image output device 100 and the images output by another image output device 200 is disposed on a left side and the other is disposed on a right side, or one of the images output by the image output device 100 and the images output by another image output device 200 is disposed on an upper side and the other is disposed on a lower side).

According to an embodiment, in the overlay manner, the images respectively output by the image output device 100 and another image output device 200 (i.e., first image and second image) may be overlaid with each other to form the third image, thus increasing the brightness (or, luminance) of the image.

According to another embodiment, in the array manner, the images respectively output by the image output device 100 and another image output device 200 may be arrayed to form one image, thus increasing the size or resolution of the image.

In case of providing the image in the overlay manner, the image output device 100 according to the various embodiments of the present disclosure may output an original image by adjusting its luminance in such a way that a dark portion (e.g., low grayscale or low luminance area) of the third image formed by overlaying the images (i.e., first image and second image) output by the image output device 100 and another image output device 200 with each other is prevented from being excessively brightened compared to a dark portion of the original image (or the image input into the image output device 100) (by limiting increase in the luminance of the dark portion), and a light portion (e.g., high grayscale or high luminance area) of the third image is more brightened compared to a light portion of the original image (by increasing the luminance of the light portion).

Figure 2:
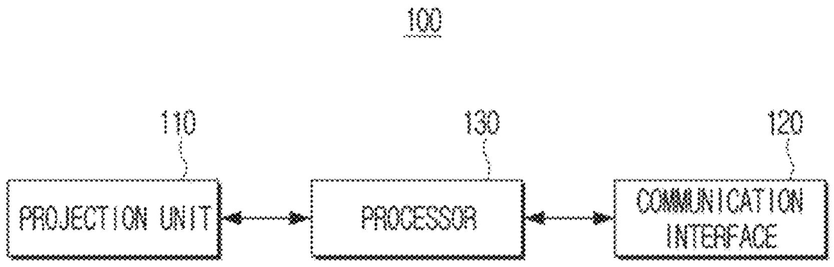
FIG. 2 is a block diagram for explaining a configuration of the image output device according to an embodiment of the present disclosure.

FIG. 2 is a block diagram for explaining a configuration of the image output device according to an embodiment of the present disclosure.

Referring to FIG. 2, the image output device 100 may include a projection unit 110, a communication interface 120, at least one processor 130.

The projection unit 110 according to an embodiment may output the image that the image output device 100 is to output onto the projection surface. The projection unit 110 according to an embodiment may include a projection lens (not shown).

Here, the projection lens may be disposed on one surface of a main body of the image output device 100, and project light passed through a lens array to the outside of the main body. The projection lens in the various embodiments may be an optical lens which is low-dispersion coated to reduce chromatic aberration. The projection lens may be a convex lens or a condensing lens, and the projection lens according to the various embodiments may adjust a focus by adjusting positions of a plurality of sub-lenses.

The projection unit 110 may perform a function of outputting the image onto the projection surface. Here, the projection surface may be a portion of a physical space onto which the image is output, or may be a separate screen. Meanwhile, a configuration of the projection unit 110 is not limited to the above-described example, and the image output device 100 may output the image onto the projection surface by using various methods.

The communication interface 120 according to an embodiment of the present disclosure may communicate with various types of external devices (e.g., image providing device or display device), external servers, or the like, and receive various types of data and information.

For example, the communication interface 120 may receive the various types of data and information from the image providing device (e.g., source device), an external storage medium (e.g., universal serial bus (USB) memory), the external server (e.g., cloud server or web hard), or the like by using a communication method/communication standard such as an access point (AP)-based wireless fidelity (Wi-Fi), i.e., wireless local area network (LAN)), a Bluetooth, a Zigbee, a wired/wireless LAN, a wide area network (WAN), Ethernet, an IEEE 1394, a high definition multimedia interface (HDMI), a USB, Thunderbolt™, a mobile high-definition link (MHL), an audio engineering society/European broadcasting union (AES/EBU) communication, an optical communication, or a coaxial communication.

In particular, the communication interface 120 according to an embodiment of the present disclosure may communicate with another image output device 200 (e.g., projector device) adjacent to the image output device 100. For example, the communication interface 120 may automatically detect another image output device 200 adjacent to the image output device 100 under control of the processor 130, and communicate with the detected another image output device 200.

As another example, the communication interface 120 may acquire a list including at least one another image output device 200 adjacent to the image output device 100 under the control of the processor 130, and communicate with a selected another image output device 200 in case that another image output device 200 is selected from the list.

At least one processor 130 may be electrically connected to a memory (not shown), and control overall operations of the image output device 100.

According to an embodiment of the present disclosure, the processor 130 may be implemented as a digital signal processor (DSP), a microprocessor, or a Time controller (TCON) that processes a digital signal. However, the processor 130 is not limited thereto, may include at least one of a central processing unit (CPU), a micro controller unit (MCU), a micro processing unit (MPU), a controller, an application processor (AP), a communication processor (CP), an advanced RISC machine (ARM) processor, or an artificial intelligence (AI) processor, or may be defined by these terms. In addition, the processor 130 may be implemented in a system-on-chip (SoC) or a large scale integration (LSI), in which a processing algorithm is embedded, or may be implemented in the form of a field programmable gate array (FPGA). The processor 130 may perform various functions by executing computer executable instructions stored in the memory.

First, the processor 130 according to an embodiment of the present disclosure may acquire the brightness information of the input image in case that the input image is received via the communication interface 120.

Here, the brightness information may include each grayscale value of a plurality of pixels included in the input image, and the output luminance corresponding to each grayscale value of the plurality of pixels.

At least one processor 130 may identify whether another image output device 200 outputs the image by adjusting its luminance by communicating with another image output device 200 that receives the same image as the input image and outputs the same image onto the projection surface.

Next, the processor 130 may adjust the luminance of at least one area included in the input image on the basis of the brightness information according to an identification result. Next, the processor 130 may control the projection unit 110 to output the luminance-adjusted image onto the projection surface.

Figure 3:
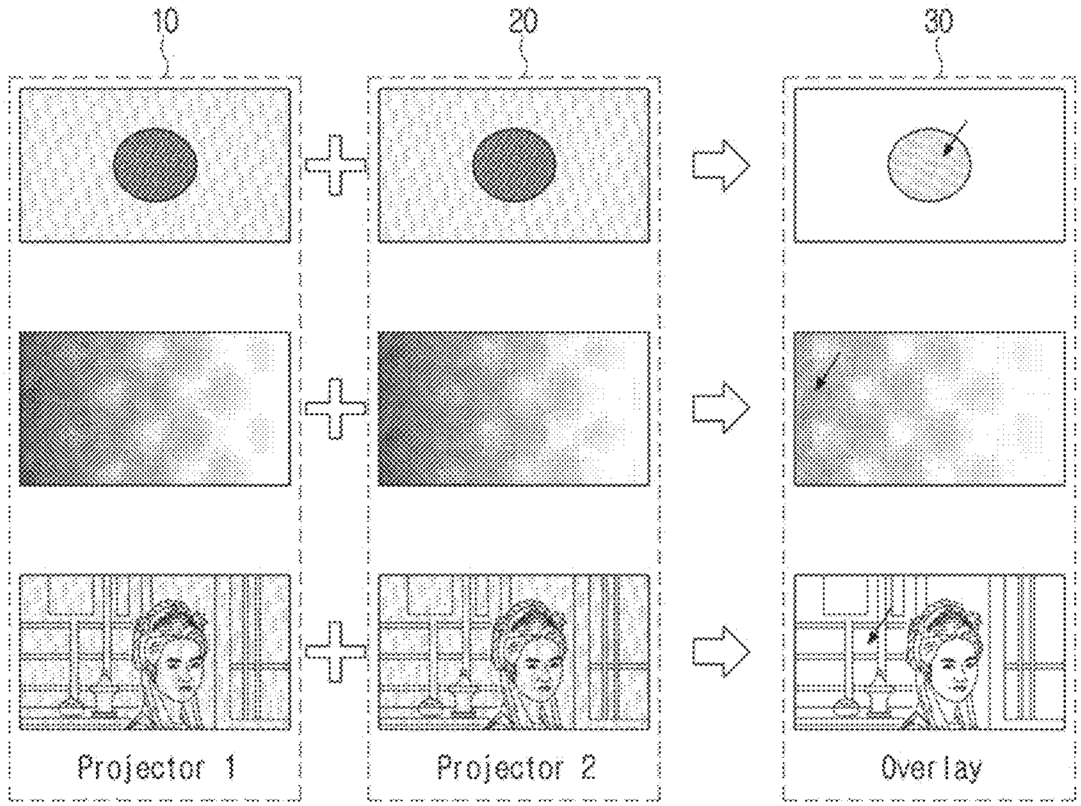
FIG. 3 is a diagram for explaining an image provided in an overlay manner according to a prior art.
Figure 4:
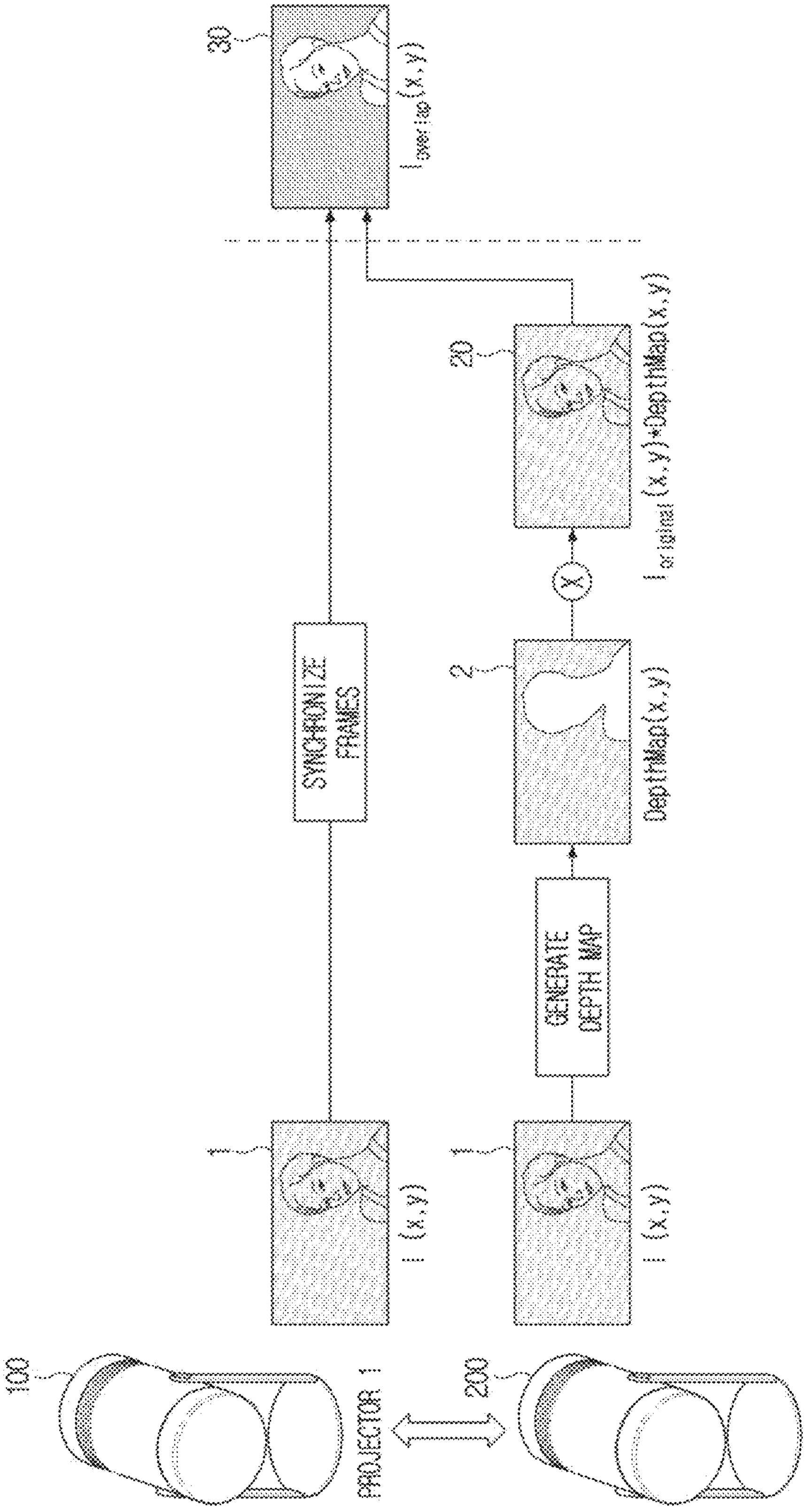
FIG. 4 is a diagram for explaining the image output device using a depth map according to an embodiment of the present disclosure.

A detailed description thereof is provided with reference to FIGS. 3 and 4.

FIG. 3 is a diagram for explaining an image provided in the overlay manner according to a prior art.

According to the overlay manner, the image output device 100 may output a first screen 10 onto the projection surface, and another image output device 200 may also output a second screen 20 onto the projection surface. Here, a position where the image output device 100 outputs the screen (hereinafter, a first projection surface) and a position where another image output device 200 outputs the screen (hereinafter, a second projection surface) may be the same as each other.

The first projection surface and the second projection surface may be the same as each other, the first screen 10 output by the image output device 100 and the second screen 20 output by another image output device 200 may thus be overlaid with each other to form a third image 30.

Meanwhile, if the image output device 100 and another image output device 200 are each implemented as the projector device, the image output device 100 and another image output device 200 may each have their own ANSI-Lumens.

A recommended luminance range (or recommended brightness range) may exist based on a usage environment, as shown in Table 1 below.

TABLE 1

| Usage environment | ANSI-Lumens |
|---|---|
| Night time | 400 ANSI or less |
| Dark and lighted room | 400 to 1,500 ANSI |
| Day time with curtains | 1,500 to 3,000 ANSI |
| Bright day time | 3,000 ANSI or more |

According to an embodiment, even though the ANSI lumens of the image output device 100 do not satisfy the recommended luminance range, as shown in FIG. 3, if the image output device 100 (e.g., projector 1) and another image output device 200 (e.g., projector 2) output the images onto the same position in the overlay manner, light intensity output from the image output device 100 and light intensity output from another image output device 200 may be overlaid with each other, and the image output device 100 and another image output device 200 may thus provide the third image 30 satisfying the recommended luminance range. Here, light intensity of each pixel in the third image may be the overlay of light intensity of each pixel in the first image and light intensity of each pixel in the second image (i.e., the first image 10+the second image 20=the third image 30). However, in the third image 30 formed by the overlay according to a conventional overlay method, the luminance of a light portion area (e.g., white area, high grayscale area, or high luminance area) and the luminance of a dark portion area (e.g., black area, low grayscale area, or low luminance area) may all be increased compared to the luminance of the input image (or the original image) (see arrows in FIG. 3), thus causing a problem of decreasing the contrast ratio, depth, and dynamic range of the third image 30 provided to the user.

FIG. 4 is a diagram for explaining the image output device using a depth map according to an embodiment of the present disclosure.

Referring to FIG. 4, at least one processor 130 included in the image output device 100 may acquire one of a depth map 2 or an object map, corresponding to an input image 1, on the basis of brightness information of the input image 1.

Here, the depth map 2 may indicate an image or an image channel that includes information related to a distance per area or pixel from an observation viewpoint in the input image 1. The object map may indicate an image or an image channel that shows the shape, appearance, or the like of a plurality of objects, a predefined object, a main object having a priority of a threshold value or more, or the like, in the input image 1.

According to an embodiment, at least one processor 130 may identify distance information of the plurality of objects included in the input image 1 on the basis of one of the depth map 2 or the object map.

Next, the processor 130 may increase the luminance of an area corresponding to a first object disposed at a relatively short distance among the plurality of objects, and decrease the luminance of an area corresponding to a second object disposed at a relatively long distance among the plurality of objects, thereby adjusting the luminance of at least one area included in the input image 1.

According to an embodiment, the processor 130 may increase the luminance of a near object (i.e., object disposed at a relatively short distance from the observation viewpoint based on the distance information), and decrease the luminance of a far object (i.e., object disposed at a relatively long distance from the observation viewpoint based on the distance information).

Next, the processor 130 may control the projection unit 110 to output the luminance-adjusted image onto the projection surface.

According to an embodiment, the first screen 10 output by the image output device 100 may indicate the luminance-adjusted image. According to an embodiment, the second screen 20 output by another image output device 200 may indicate the luminance-unadjusted image.

The third image 30, which is formed by overlaying the first screen 10 output by the image output device 100 and the second screen 20 output by another image output device 200 with each other, may be expressed in Equation 1 below.

$$Ioverlay(x, y) = Ioriginal(x, y) + Ioriginal(x, y) * 2D \text{ Region Map}(x, y) \quad \text{[Equation 1]}$$

Here, (x, y) indicates pixel coordinates, Ioverlay indicates the third image 30, and Ioriginal indicates the input image (or the original image). 2D Region Map may include the depth map, the object map, a saliency mask, or the like. In the description above, the image output device 100 may output the luminance-adjusted image, and another image output device 200 may output the luminance-unadjusted image. Therefore, Ioriginal (x,y)*2D Region Map (x,y) may indicate the first screen 10, and Ioriginal (x,y) may indicate the second screen 20.

Meanwhile, the opposite of the description above is also possible. It is apparent that the image output device 100 may output the luminance-unadjusted image, and another image output device 200 may output the luminance-adjusted image, as shown in FIG. 4. In this case, in Equation 1, Ioriginal (x,y) may indicate the first screen 10, and Ioriginal (x,y)*2D Region Map (x,y) may indicate the second screen 20.

Referring to FIG. 4, another image output device 200 may output the luminance-adjusted image (i.e., second screen 20), thus increasing the luminance of an area corresponding to the object (e.g., person or thing) in the third image 30, formed by overlaying the first screen 10 and the second screen 20 with each other, and decreasing the luminance of the remaining area (e.g., background) may be decreased or limiting its increase.

Meanwhile, according to an embodiment of the present disclosure, the image output device 100 and another image output device 200 may communicate with each other. Accordingly, one of the image output device 100 and another image output device 200 may output the luminance-adjusted image and the other may output the luminance-unadjusted image.

For example, at least one processor 130 included in the image output device 100 may communicate with another image output device 200 via the communication interface 120 to thus set one of the image output device 100 and another image output device 200 as a master and the other as a slave.

For example, the image output device 100 may receive identification information from another image output device 200, and the processor 130 may compare the identification information of the image output device 100 with the identification information of another image output device 200 to thus set one of the devices as the master and the other as the slave on the basis of a comparison result. For example, the processor 130 may compare the identification information of the image output device 100 with the identification information of another image output device 200, and set the image output device 100 as the master and another image output device 200 as the slave if the image output device 100 is capable of outputting an image having relatively higher brightness than another image output device 200. Here, the identification information may indicate the details or specifications (e.g., brightness (or ANSI lumens), contrast ratio, or resolution) of a component included in the device. However, this configuration is only an example, and may not be limited thereto.

For example, it is apparent that at least one processor 130 may communicate with another image output device 200 via the communication interface 120 to thus randomly set one of the image output device 100 and another image output device 200 as the master and the other as the slave.

Next, at least one processor 130 may transmit a control signal to another image output device 200 for another image output device 200 to output the image by adjusting its luminance, and control the projection unit 110 to output the input image 1 without adjusting the luminance of the input image 1 if another image output device 200 is set as the slave.

As another example, at least one processor 130 may transmit a control signal to another image output device 200 for another image output device 200 to output the image without adjusting its luminance, and control the projection unit 110 to output the adjusted input image after adjusting the luminance of the input image 1 if another image output device 200 is set as the master.

Figure 5:
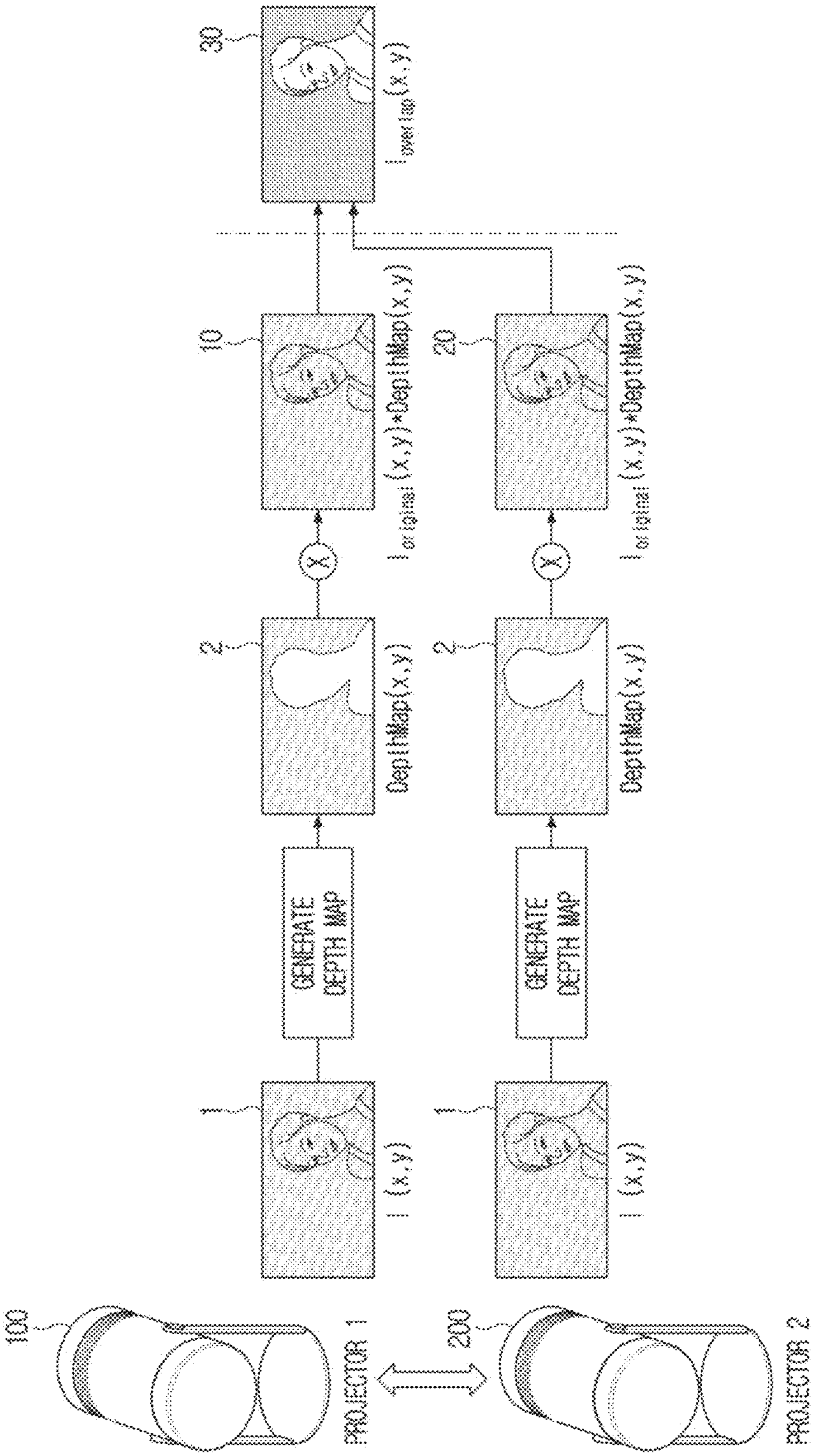
FIG. 5 is a diagram for explaining an image output device using a depth map according to another embodiment of the present disclosure.

FIG. 5 is a diagram for explaining an image output device using a depth map according to another embodiment of the present disclosure.

Referring to FIG. 5, each of the image output device 100 and another image output device 200 may adjust the luminance of the input image 1 and output the luminance-adjusted image.

For example, at least one processor 130 included in the image output device 100 may increase the luminance of an area corresponding to the first object disposed at the relatively short distance among the plurality of objects included in the input image 1 on the basis of one of the depth map 2 or the object map, and decrease the luminance of an area corresponding to the second object disposed at the relatively long distance, thereby acquiring the luminance-adjusted image, that is, the first image 10. Next, at least one processor 130 may control the projection unit 110 to output the luminance-adjusted image onto the projection surface.

In addition, another image output device 200 may increase the luminance of the area corresponding to the first object disposed at the relatively short distance among the plurality of objects included in the image 1 on the basis of one of the depth map 2 or the object map, and decrease the luminance of the area corresponding to the second object disposed at the relatively long distance, thereby acquiring the luminance-adjusted image, that is, the second image 20. Next, another image output device 200 may output the luminance-adjusted image onto the projection surface.

Here, the depth map 2 (or the object map) used by the image output device 100 may be the same as or different from the depth map 2 (or the object map) used by another image output device 200.

For example, if another image output device 200 is identified as outputting the image by adjusting the luminance, the image output device 100 may transmit the depth map 2 or the object map, corresponding to the input image 1, to another image output device 200, or receive the depth map 2 or the object map from another image output device 200.

Next, in the third image 30 formed by overlaying the first screen 10 and the second screen 20 with each other, the luminance of the light portion may be increased compared to the luminance of the input image 1 (or the original image), and the luminance of the dark portion may not be increased excessively (or the increase in the luminance may be limited) as shown in FIG. 3 even though the luminance is increased compared to the luminance of the input image 1, thus increasing the contrast ratio, depth, and dynamic range DR of the third image 30.

The third image 30 formed by overlaying the first screen 10 output by the image output device 100 and the second screen 20 output by another image output device 200 with each other, as shown in FIG. 5, may be expressed in Equation 2 below.

$$Ioverlay(x, y) = \text{Alpha} * Ioriginal(x, y) * 2D \text{ Region Map}(x, y) + \text{Beta} * Ioriginal(x, y) * 2D \text{ Region Map}(x, y) \quad \text{[Equation 2]}$$

Here, (x, y) indicates the pixel coordinates, Ioverlay indicates the third image 30, and Ioriginal indicates the input image (or the original image). 2D Region Map may include the depth map, the object map, the saliency mask, or the like. In the description above, the image output device 100 may apply a weight of Alpha to the luminance-adjusted image, and another image output device 200 may apply a weight of Beta to the luminance-adjusted image. Therefore, Alpha*Ioriginal (x,y)*2D Region Map (x,y) may indicate the first screen 10, and Beta*Ioriginal (x,y)*2D Region Map (x,y) may indicate the second screen 20.

Here, each weight of Alpha and Beta may have a value between 0 and 1, and the weights may be the same or different values.

According to an embodiment, each of the image output device 100 and another image output device 200 may acquire the weights of Alpha and Beta on the basis of a difference in light sources (or brightness (i.e., ANSI lumens)) and a difference in 2D Region Maps.

Figure 6:
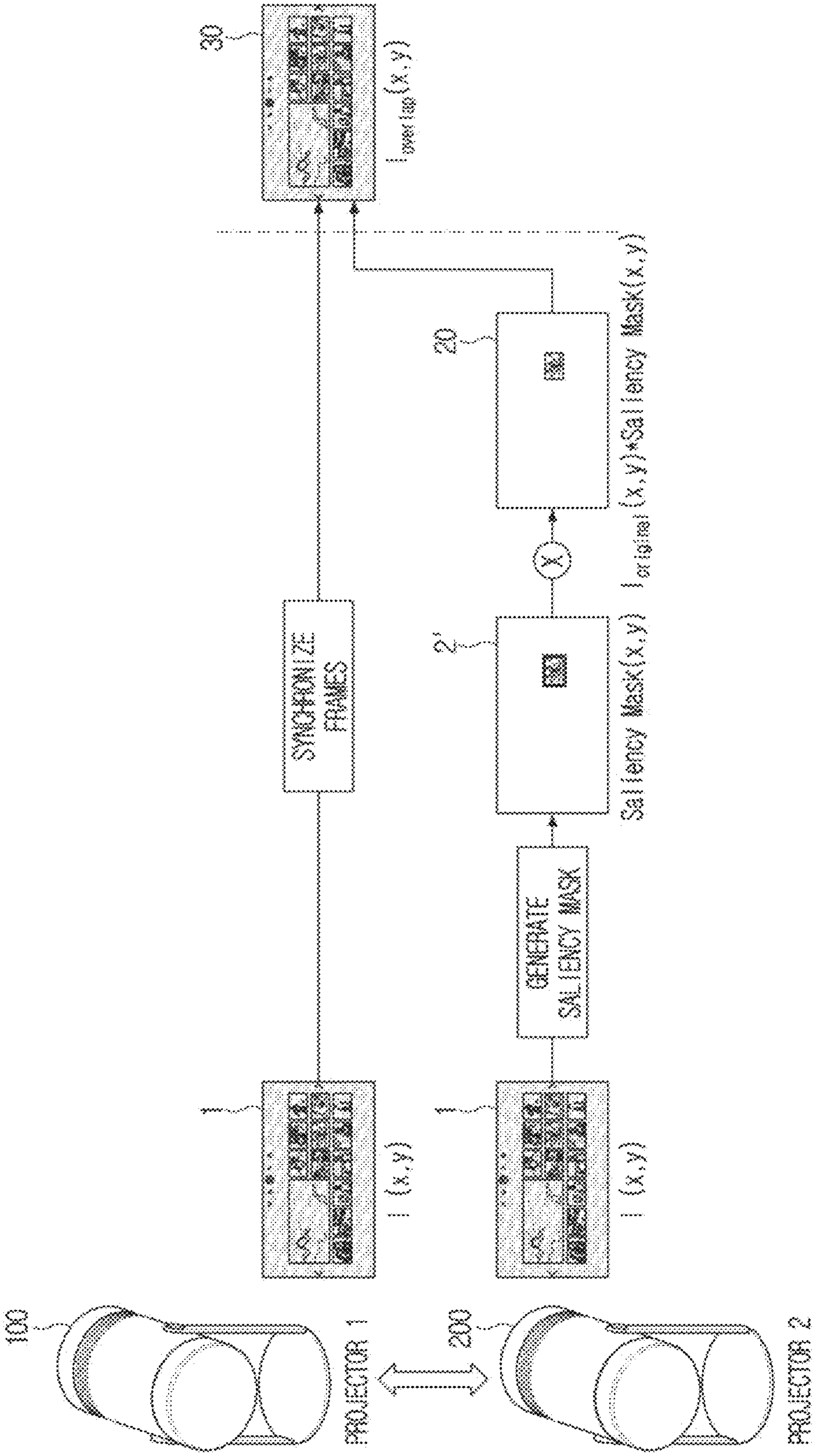
FIG. 6 is a diagram for explaining the image output device using a saliency map according to an embodiment of the present disclosure.

FIG. 6 is a diagram for explaining the image output device using a saliency map according to an embodiment of the present disclosure.

At least one processor 130 according to an embodiment of the present disclosure may identify at least one object corresponding to a user selection among the plurality of objects included in the input image 1.

Next, the processor 130 may increase the luminance of an area corresponding to at least one identified object and decrease the luminance of the remaining area, thereby acquiring the luminance-adjusted image.

In detail, at least one processor 130 may acquire the saliency map (or the saliency mask) from the input image 1.

Next, at least one processor 130 may identify at least one object corresponding to the user selection among the plurality of objects included in the input image 1. Next, at least one processor 130 may increase the luminance of an area (hereinafter, an area of interest) corresponding to at least one object identified and decrease the luminance of the remaining area, on the basis of the saliency map.

As another example, at least one processor 130 may output only the area of interest in the input image without outputting the remaining area.

Referring to FIG. 6, in the third image 30 formed by overlaying the first screen 10 and the second screen 20 with each other, the luminance of the area of interest may be increased compared to the luminance of the input image 1 (or the original image), and the luminance of the remaining area may not be increased excessively (or the increase in the luminance may be limited) as shown in FIG. 3 even though the luminance is increased compared to the luminance of the input image 1, thus achieving an effect of strengthening visibility of the area of interest in the third image 30 (similar to a highlight effect).

The third image 30, which is formed by overlaying the first screen 10 output by the image output device 100 and the second screen 20 output by another image output device 200 with each other, may be expressed in Equation 3 below.

$$Ioverlay(x, y) = Ioriginal(x, y) + Ioriginal(x, y) * 2D \text{ Region Map}(x, y) \quad \text{[Equation 3]}$$

Here, (x, y) indicates the pixel coordinates, Ioverlay indicates the third image 30, and Ioriginal indicates the input image (or the original image). 2D Region Map may include the depth map, the object map, the saliency mask, or the like. In the description above, the image output device 100 may output an image where the area of interest has the increased luminance, and another image output device 200 may output the image as it is. Therefore, Ioriginal (x,y)*2D Region Map (x,y) may indicate the first screen 10, and Ioriginal (x,y) may indicate the second screen 20.

Meanwhile, the opposite of the description above is also possible. It is apparent that the image output device 100 may output the input image as it is, and another image output device 200 may output the image where the area of interest has the increased luminance, as shown in FIG. 6. In this case, in Equation 3, Ioriginal (x,y) may indicate the first screen 10, and Ioriginal (x,y)*2D Region Map (x,y) may indicate the second screen 20.

Figure 7:
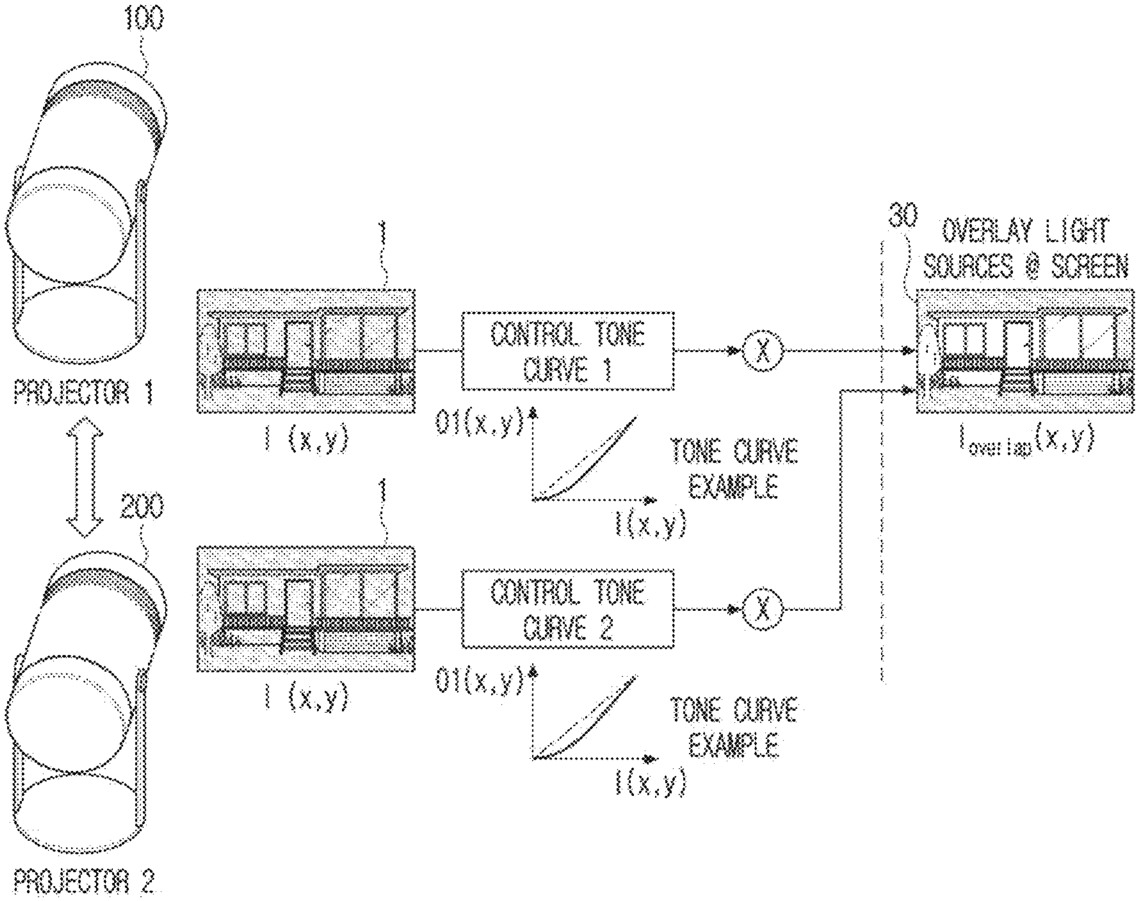
FIG. 7 is a diagram for explaining the image output device using a tone map curve according to an embodiment of the present disclosure.

FIG. 7 is a diagram for explaining the image output device using a tone map curve according to an embodiment of the present disclosure.

At least one processor 130 according to an embodiment of the present disclosure may acquire the adjusted image, where the luminance of a relatively bright area (e.g., high grayscale or high luminance) is increased and the luminance of a relatively dark area (e.g., low grayscale or low luminance) is decreased, among the plurality of areas included in the input image 1, on the basis of the brightness information of the input image 1 and the tone map curve for expanding its dynamic range DR.

At least one processor 130 according to an embodiment of the present disclosure may perform tone mapping on each pixel value of the plurality of pixels included in the input image 1 on the basis of the tone map curve.

Next, at least one processor 130 may acquire the luminance-adjusted image based on the tone mapping. Here, the luminance of the dark portion in the luminance-adjusted image may be maintained as the luminance of the dark portion (e.g., low grayscale or black area) in the input image 1, and the luminance of the light portion in the luminance-adjusted image may be increased compared to the luminance of the light portion (e.g., medium grayscale or high grayscale area) in the input image 1. Therefore, the dynamic range DR of the luminance-adjusted image may be increased compared to the dynamic range of the input image 1, and its contrast ratio and depth may also be increased.

As shown in FIG. 7, the image output device 100 may output the luminance-adjusted image, that is, the first image 10, and another image output device 200 may also output the luminance-adjusted image, that is, the second image 20, thereby providing the third image 30.

Here, the third image may be expressed in Equation 4 below.

$$Ioverlay(x, y) = \text{Alpha} * \text{Tone Map Curve } 1(Ioriginal(x, y)) + \text{Beta} * \text{Tone Map Curve } 2(Ioriginal(x, y)) \quad \text{[Equation 4]}$$

Here, (x, y) indicates the pixel coordinates, Ioverlay indicates the third image 30, and Ioriginal indicates the input image (or the original image). Tone Map Curve 1 may indicate the tone map curve used by the image output device 100 for the tone mapping, and Tone Map Curve 2 may indicate the tone map curve used by another image output device 200 for the tone mapping. In the description above, the image output device 100 may apply the weight of Alpha to the luminance-adjusted image, and another image output device 200 may apply the weight of Beta to the luminance-adjusted image. Therefore, Alpha*Tone Map Curve 1 (Ioriginal (x,y)) may indicate the first screen 10, and Beta*Tone Map Curve 2 (Ioriginal (x,y)) may indicate the second screen 20.

Here, each weight of Alpha and Beta may have a value between 0 and 1, and the weights may be the same or different values.

According to an embodiment, each of the image output device 100 and another image output device 200 may acquire the weights of Alpha and Beta on the basis of the difference in the light sources (or the brightness (i.e., ANSI lumens)) and the difference in the tone map curves.

Meanwhile, Tone Map Curve 1 and Tone Map Curve 2 may be the same or different. For example, the image output device 100 and another image output device 200 may share the tone map curve and may use the same tone map curve for the tone mapping. As another example, it is apparent that the image output device 100 and another image output device 200 may each use the different tone map curves pre-stored in the tone mapping.

Figure 8:
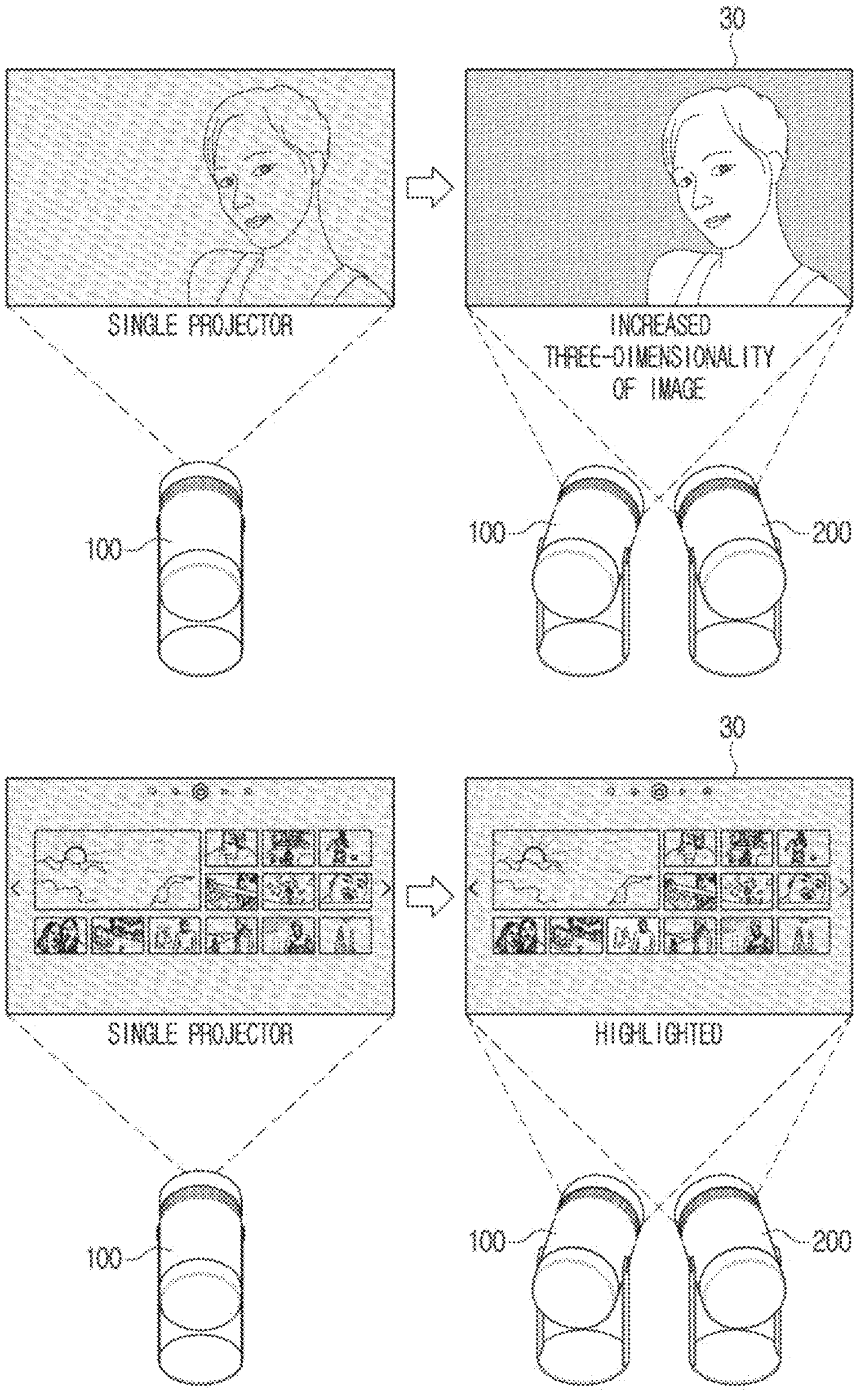
FIG. 8 is a diagram for explaining an image provided in an overlay manner according to an embodiment of the present disclosure.

FIG. 8 is a diagram for explaining an image provided in the overlay manner according to an embodiment of the present disclosure.

Referring to an upper side of FIG. 8, in case that a single projector device outputs an image, there is a risk that the maximum brightness of the image capable of being provided may be limited by the brightness of the projector device.

For example, if the maximum brightness (e.g., ANSI lumens) of the projector device is 400 lumens, and a surrounding environment of the projector device is bright daytime and outdoors, the luminance of the image provided by the projector device may be below the recommended luminance range, and the image may appear slightly dark or have poor visibility from the user's viewpoint.

The third image 30, which is formed by overlaying the first image 10 output by the image output device 100 and the second image 20 output by another image output device 200 with each other in the overlay manner, may be provided while having the same light intensity as the sum of the maximum light intensity that the image output device 100 may output and the maximum light intensity that another image output device 200 may output, thus maintaining its visibility even in case that the surrounding environment is bright daytime and outdoors.

However, the luminance of an area in the third screen 30 that corresponds to a relatively dark area in the input image 1 may be increased, thus causing the problem of decreasing the dynamic range, contrast ratio, or the like of the third screen 30.

According to the various embodiments of the present disclosure, at least one of the image output device 100 or another image output device 200 may adjust the luminance of at least one area included in the input image 1, and output the luminance-adjusted image onto the projection surface, thereby increasing the dynamic range, contrast ratio, depth, three-dimensionality, or the like of the third image 30.

As another example, referring to a lower side of FIG. 8, the projector device may provide the third image 30 where an object corresponding to a user input (hereinafter, the object of interest) or an area corresponding to the user input (hereinafter, the area of interest) is adjusted to a high luminance among the plurality of objects or areas included in the input image 1.

Figure 9:
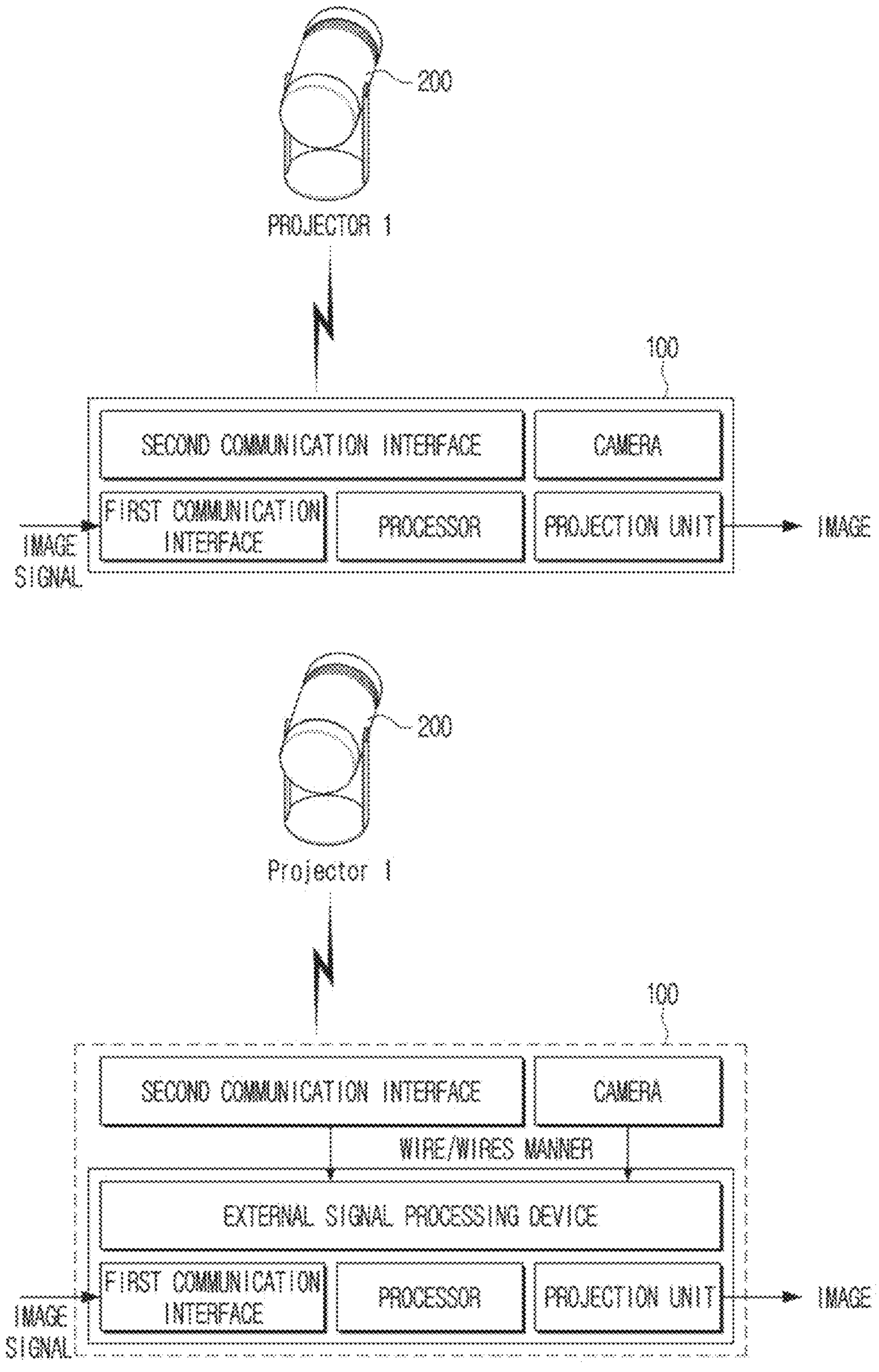
FIG. 9 is a detailed block diagram for explaining a detailed configuration of the image output device according to an embodiment of the present disclosure.

FIG. 9 is a detailed block diagram for explaining a detailed configuration of the image output device according to an embodiment of the present disclosure.

Referring to an upper side of FIG. 9, the image output device 100 may receive the input image 1 from the external device (e.g., source device) via a first communication interface.

In addition, the image output device 100 may communicate with another image output device 200 via a second communication interface.

For example, at least one processor 130 included in the image output device 100 may control the projection unit 110 to output the luminance-adjusted image to a corresponding position on the projection surface on the basis of received position information if position information on the projection surface onto which another image output device 200 outputs the image is received via the second communication interface.

The image output device 100 according to an embodiment of the present disclosure may communicate with another image output device 200 via the second communication interface, thereby synchronizing the output of the first image 10 with the output of the second image 20.

The image output device 100 according to an embodiment of the present disclosure may include a sensor. Here, the sensor may include a camera.

At least one processor 130 may acquire, through the sensor, the position information on the projection surface onto which another image output device 20 outputs the second image 20, and may control the projection unit 110 to output the luminance-adjusted image to the corresponding position on the projection surface on the basis of the acquired position information.

At least one processor 130 according to an embodiment may perform a keystone correction function, a leveling correction function, or the like for controlling the projection unit 110 to output the image to the corresponding position on the projection surface.

Here, the keystone correction function may be a function for solving a problem that a trapezoidal image is output onto the projection surface due to the tilt of the electronic device 100.

Here, the keystone correction function may be a function for correcting the image for the trapezoidal image output onto the projection surface to be output as a rectangular or square image. The keystone correction function may be classified into horizontal keystone correction or vertical keystone correction based on a direction of keystone correction.

Here, the leveling correction function may indicate a function of rotating the image. In detail, the processor 130 may control the projection unit 110 to output the image by rotating the image by a certain angle using the leveling correction function.

Referring to the upper side of FIG. 9, the image output device 100 according to another example may be connected to an additional device, wherein the additional device may include the second communication interface and the camera as described above.

The image output device 100 and the additional device may be connected to each other through an external signal processing device. Here, the external signal processing device may also be referred to as a connector.

The external signal processing device may connect the image processing device 100 and the additional device to each other in a wired manner or a wireless manner to thus transmit and receive an electrical signal from the additional device. The connector may be physically connected to the additional device. Here, it is apparent that the connector may include various types of wired communication modules such as an HDMI connection terminal and a USB connection terminal, and may also include various types of wireless communication modules such as Bluetooth and Wi-Fi.

Figure 10:
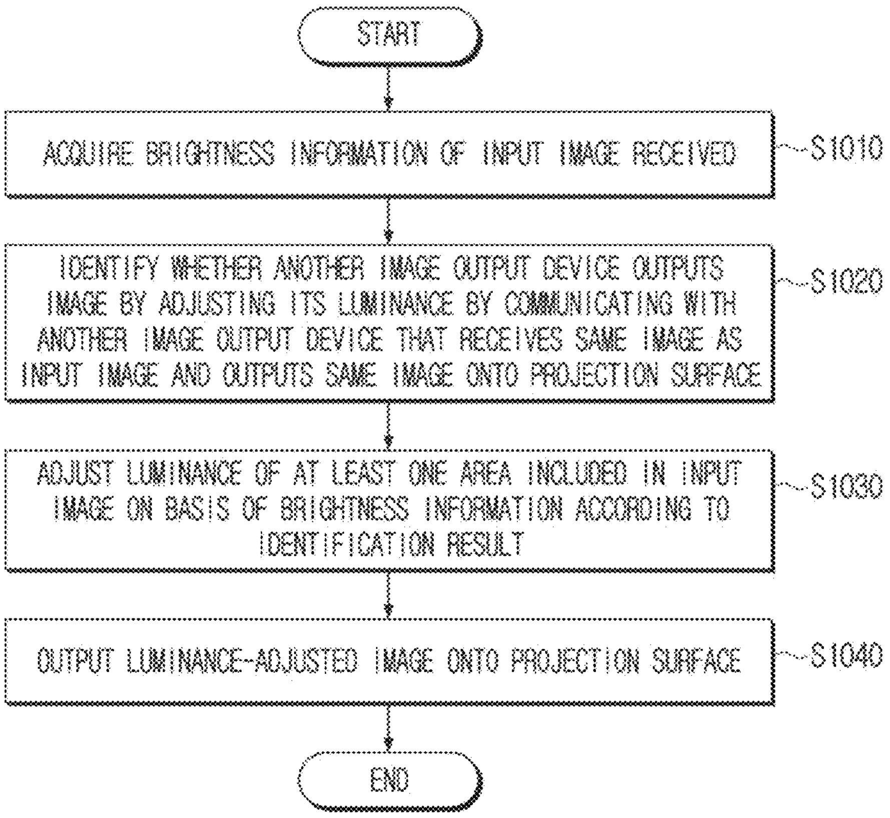
FIG. 10 is a flowchart for explaining a control method for a display device according to an embodiment of the present disclosure.

FIG. 10 is a flowchart for explaining a control method for an image processing device according to an embodiment of the present disclosure.

The control method of an image output device according to an embodiment for achieving the above-described purpose of the present disclosure may first include acquiring brightness information of an input image (S1010).

Next, the method may include identifying whether another image output device outputs the image by adjusting its luminance by communicating with another image output device that receives the same image as the input image and outputs the same image onto a projection surface (S1020).

Next, the method may include adjusting the luminance of at least one area included in the input image on the basis of the brightness information according to an identification result (S1030).

Next, the method may include outputting the luminance-adjusted image onto the projection surface (S1040).

Here, in the adjusting (S1020), the adjusted image, where the luminance of a relatively bright area is increased and the luminance of a relatively dark area is decreased, among the plurality of areas included in the input image, may be acquired on the basis of the brightness information and a tone map curve for expanding a dynamic range DR.

The adjusting (S1020) according to an embodiment of the present disclosure may include acquiring one of a depth map, an object map, or a saliency map, corresponding to the input image, on the basis of the brightness information of the input image, identifying distance information of a plurality of objects included in the input image on the basis of one of the depth map, the object map, or the saliency map, increasing the luminance of an area corresponding to a first object disposed at a relatively short distance among the plurality of objects, and decreasing the luminance of an area corresponding to a second object disposed at a relatively long distance among the plurality of objects.

The control method according to an embodiment of the present disclosure may further include transmitting, to another image output device, at least one of a tone map curve used by the image output device or a depth map or an object map, corresponding to the input image, if another image output device is identified as outputting the image by adjusting its luminance.

In the outputting (S1040) according to an embodiment of the present disclosure, the adjusted image may be output to a corresponding position on the projection surface on the basis of received position information if position information on the projection surface onto which another image output device outputs the image is received.

The image output device according to an embodiment of the present disclosure may include a sensor, and the control method may further include acquiring, through the sensor, position information on the projection surface onto which another image output device outputs the image, wherein in the outputting (S1040), the adjusted image may be output to the corresponding position on the projection surface on the basis of the acquired position information.

The control method according to an embodiment of the present disclosure may further include: setting one of another image output device and the image output device as a master and the other as a slave, transmitting a control signal to another image output device for another image output device to output the image by adjusting its luminance, and outputting the input image without adjusting the luminance of the input image if another image output device is set as the slave, and transmitting a control signal to another image output device for another image output device to output the image without adjusting its luminance, and outputting the adjusted input image after adjusting the luminance of the input image if another image output device is set as the master.

The control method according to an embodiment of the present disclosure may further include identifying at least one object corresponding to a user selection among the plurality of objects included in the input image, wherein in the adjusting (S1020), the adjusted image may be acquired by increasing the luminance of an area corresponding to the identified at least one object and decreasing the luminance of the remaining area.

According to an embodiment of the present disclosure, a projection screen output by the image output device and a projection screen output by another image output device may be overlaid with each other at the same position on the projection surface.

However, it is apparent that the various embodiments of the present disclosure may be applied not only to the electronic device but also to every type of electronic device including the display.

Meanwhile, the various embodiments of the present disclosure described above may be implemented in a computer or a computer-readable recording medium using software, hardware, or a combination of software and hardware. In some cases, the embodiments described in the present disclosure may be implemented by the processor itself. According to software implementation, the embodiments such as the procedures and functions described in the specification may be implemented by separate software modules. Each of the software modules may perform one or more functions and operations described in the specification.

Meanwhile, a non-transitory computer-readable medium may store computer instructions for performing processing operations of the electronic device according to the various embodiments of the present disclosure described above. The computer instructions stored in the non-transitory computer-readable medium may allow a specific device to perform the processing operations of the image output device 100 according to the various embodiments described above in case of being executed by a processor of the specific device.

The non-transitory computer-readable medium is not a medium that stores data therein for a while, such as a register, a cache, or a memory, and indicates a medium that semi-permanently stores data therein and is readable by a machine. A specific example of the non-transitory computer-readable medium may include a compact disk (CD), a digital versatile disk (DVD), a hard disk, a Blu-ray disk, a universal serial bus (USB), a memory card, a read-only memory (ROM), or the like.

Although the embodiments are shown and described in the present disclosure hereinabove, the present disclosure is not limited to the above-mentioned specific embodiments, and may be variously modified by those skilled in the art to which the present disclosure pertains without departing from the gist of the present disclosure as claimed in the accompanying claims. These modifications should also be understood to fall within the scope and spirit of the present disclosure.

What is claimed is:

1. An image output device comprising:
- a projector;
- a communication interface including a circuit;
- memory storing instructions; and
- at least one processor,
- wherein the instructions, when executed by the at least one processor, cause the image output device to:
- acquire brightness information of an input image received via the communication interface,
- communicate with another image output device that receives the same image as the input image and outputs the same image onto a projection surface, to identify whether the another image output device performs luminance adjustment on the image;
- adjust luminance of at least one area included in the input image based on the brightness information and a result of the identifying so as to avoid redundant luminance adjustment between the image output device,
- identify at least one object corresponding to a user selection among a plurality of objects included in the input image, and
- acquire the adjusted input image by increasing the luminance of an area corresponding to the identified at least one object and decreasing the luminance of a remaining area, and
- control the projector to output the adjusted input image onto the projection surface.

2. The image output device as claimed in claim 1, wherein the instructions, when executed by the at least one processor, cause the image output device to acquire the adjusted input image, where the luminance of a relatively bright area is increased and the luminance of a relatively dark area is decreased, among the at least one area included in the input image, based on the brightness information and a tone map curve for expanding a dynamic range.

3. The image output device as claimed in claim 1, wherein the instructions, when executed by the at least one processor, cause the image output device to:
- acquire one of a depth map, an object map, or a saliency map, corresponding to the input image, based on the brightness information of the input image,
- identify distance information of the plurality of objects included in the input image based on one of the depth map or the object map,
- increase the luminance of an area corresponding to a first object disposed at a relatively short distance among the plurality of objects, and
- decrease the luminance of an area corresponding to a second object disposed at a relatively long distance among the plurality of objects.

4. The image output device as claimed in claim 1, wherein the instructions, when executed by the at least one processor, cause the image output device to transmit, to the another image output device, at least one of a tone map curve used by the image output device or a depth map or an object map, corresponding to the input image, based on the another image output device being identified as outputting the input image by adjusting its luminance.

5. The image output device as claimed in claim 1, wherein the instructions, when executed by the at least one processor, cause the image output device to control the projector to output the adjusted input image to a corresponding position on the projection surface based on received position information if position information on the projection surface onto which the another image output device outputs the input image is received.

6. The image output device as claimed in claim 1, further comprising a sensor, wherein the instructions, when executed by the at least one processor, cause the image output device to:

acquire, through the sensor, position information on the projection surface onto which the another image output device outputs the input image, and control the projector to output the adjusted input image to a corresponding position on the projection surface based on the acquired position information.

7. The image output device as claimed in claim 1, wherein the instructions, when executed by the at least one processor, cause the image output device to:

set one of the another image output device and the image output device as a master and set the other as a slave, transmit a first control signal to the another image output device for the another image output device to output the input image by adjusting its luminance, and control the projector to output the input image without adjusting the luminance of the input image based on the another image output device being set as the slave, and transmit a second control signal to the another image output device for the another image output device to output the input image without adjusting its luminance, and control the projector to output the adjusted input image after adjusting the luminance of the input image based on the another image output device being set as the master.

8. The image output device as claimed in claim 1, wherein a projection screen output by the image output device and a projection screen output by the another image output device are overlaid at the same position on the projection surface.

9. A control method for an image output device, the control method comprising:

acquiring brightness information of an input image;

communicating with another image output device that receives the same image as the input image and outputs the same image onto a projection surface, to identify whether the another image output device performs luminance adjustment on the image;

adjusting luminance of at least one area included in the input image based on the brightness information and a result of the identifying so as to avoid redundant luminance adjustment between the image output device;

identifying at least one object corresponding to a user selection among a plurality of objects included in the input image;

acquiring the adjusted input image by increasing the luminance of an area corresponding to the identified at least one object and decreasing the luminance of a remaining area; and outputting the adjusted input image onto the projection surface.

10. The control method as claimed in claim 9, wherein in the adjusting, the adjusted input image is acquired where the luminance of a relatively bright area is increased and the luminance of a relatively dark area is decreased, among the at least one area included in the input image, based on the brightness information and a tone map curve for expanding a dynamic range.

11. The control method as claimed in claim 10, wherein the adjusting includes:

acquiring one of a depth map, an object map, or a saliency map, corresponding to the input image, based on the brightness information of the input image, identifying distance information of the plurality of objects included in the input image based on one of the depth map or the object map, increasing the luminance of an area corresponding to a first object disposed at a relatively short distance among the plurality of objects, and decreasing the luminance of an area corresponding to a second object disposed at a relatively long distance among the plurality of objects.

12. The control method as claimed in claim 9, further comprising transmitting, to the another image output device, at least one of a tone map curve used by the image output device or a depth map or an object map, corresponding to the input image, based on the another image output device being identified as outputting the image by adjusting its luminance.

13. The control method as claimed in claim 9, wherein in the outputting, the adjusted input image is output to a corresponding position on the projection surface based on received position information if position information on the projection surface onto which the another image output device outputs the image is received.

14. The control method as claimed in claim 9, in which the image output device includes a sensor, further comprising acquiring, through the sensor, position information on the projection surface onto which the another image output device outputs the image, wherein in the outputting, the adjusted input image is output to a corresponding position on the projection surface based on the acquired position information.

15. A non-transitory computer-readable medium which stores a computer instruction for causing an image output device to perform an operation when executed by a processor of the image output device, wherein the operation includes:

acquiring brightness information of an input image;

communicating with another image output device that receives the same image as the input image and outputs the same image onto a projection surface, to identify whether the another image output device performs luminance adjustment on the image;

adjusting luminance of at least one area included in the input image based on the brightness information and a result of the identifying so as to avoid redundant luminance adjustment between the image output device;

identifying at least one object corresponding to a user selection among a plurality of objects included in the input image;

acquiring the adjusted input image by increasing the luminance of an area corresponding to the identified at least one object and decreasing the luminance of a remaining area; and outputting the adjusted input image onto the projection surface.

16. The non-transitory computer-readable medium as claimed in claim 15, wherein in the adjusting, the adjusted input image is acquired where the luminance of a relatively bright area is increased and the luminance of a relatively dark area is decreased, among the at least one area included in the input image, based on the brightness information and a tone map curve for expanding a dynamic range.

17. The non-transitory computer-readable medium as claimed in claim 15, wherein the adjusting includes:

acquiring one of a depth map, an object map, or a saliency map, corresponding to the input image, based on the brightness information of the input image, identifying distance information of the plurality of objects included in the input image based on one of the depth map or the object map, increasing the luminance of an area corresponding to a first object disposed at a relatively short distance among the plurality of objects, and decreasing the luminance of an area corresponding to a second object disposed at a relatively long distance among the plurality of objects.

18. The non-transitory computer-readable medium as claimed in claim 15, the operation further includes:

transmitting, to the another image output device, at least one of a tone map curve used by the image output device or a depth map or an object map, corresponding to the input image, based on the another image output device being identified as outputting the image by adjusting its luminance.

19. The non-transitory computer-readable medium as claimed in claim 15, wherein in the outputting, the adjusted input image is output to a corresponding position on the projection surface based on received position information if position information on the projection surface onto which the another image output device outputs the image is received.

* * * * *